United States Patent Office 3,487,895
Patented Jan. 6, 1970

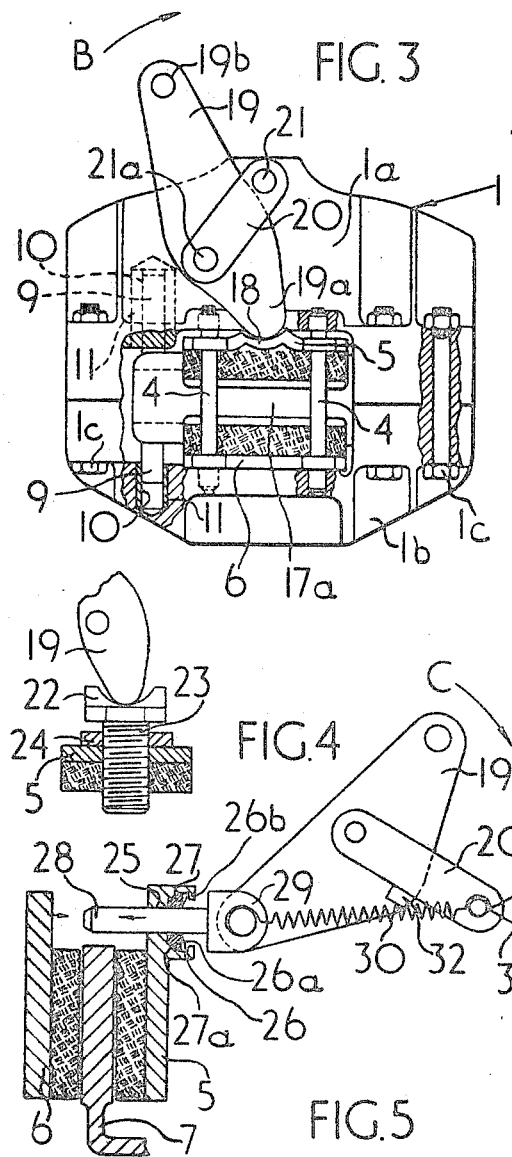

3,487,895
AXIALLY MOVABLE CALIPER DISC BRAKE
Hermann Seip, Bad Vilbel, Germany, assignor to Dunlop Rubber Company Limited, Fort Dunlop, Erdington, Birmingham, England, a corporation of Great Britain
Continuation of application Ser. No. 537,887, Mar. 28, 1966. This application Mar. 20, 1968, Ser. No. 715,448
Claims priority, application Germany, Mar. 27, 1965, T 28,272
Int. Cl. F16d 55/00, 65/14
U.S. Cl. 188—73                 15 Claims

ABSTRACT OF THE DISCLOSURE

A floating caliper disc brake includes a relatively fixed nonrotatable frame having axially extending lugs whereon is mounted a caliper which is positioned relatively to the disc on the lugs which serve to guide the caliper for its axial movement relative to the disc and two friction elements movable against the disc relative to the frame which provides anchoring surfaces for the friction elements.

This invention relates to disc brakes, and this application is a continuation in whole of application Ser. No. 537,887, filed Mar. 28, 1966, for "Disc Brakes," and now abandoned, and particularly to disc brakes of the floating caliper type.

In disc brakes of the floating caliper type, the caliper is mounted on a nonrotatable support so as to be axially movable relative to an associated rotatable but axially-fixed disc. A fixed friction element is attached to one limb of the caliper and a movable friction element is supported by the other limb and movable axially towards the disc by a thrust device mounted on the caliper. When the thrust device is operated the friction element fixed to the caliper is also moved towards the disc by the reaction on the caliper created when the movable friction element engages the disc.

One object of the present invention is to provide means for supporting and guiding the caliper for axial movement relative to the disc.

According to the invention a floating caliper disc brake comprises a rotatable axially fixed disc, a nonrotatable support, an axially movable caliper having a pair of limbs straddling a periphery of the disc, one limb having a friction element fixed thereto and the other limb having a friction element axially movably supported relative thereto, a thrust device for moving the movable friction element towards the disc, and a guide frame attached to the support on one side of the disc and extending around the periphery of the disc to provide guide means for the friction elements, the guide frame also having axially extending guide members associated therewith on each side of the disc to guide the caliper for axial movement relative to the disc.

Preferably two guide members are provided on each side of the frame, the guide members being disposed in a plane which contains the axis of the thrust device and which is parallel to the tangential direction of rotation of the disc adjacent the friction elements. One advantage of this arrangement is that no torque is applied to the guides through the caliper when the brake is operated, since the resultant brake drag acts in the same plane as the guides.

The invention is illustrated, by way of example, in the embodiments shown in the accompanying drawings, in which:

FIGURE 3 is a partly cross-sectional view, of the brake shown in FIGURE 1, taken in the direction of the arrow A;

FIGURE 4 shows, in cross-section, an adjustment device forming a modification of the brake shown in FIGURES 1–3;

FIGURE 5 is an axial cross-sectional view showing a modified parking brake for the brake shown in FIGURES 1–3.

Figure 1:
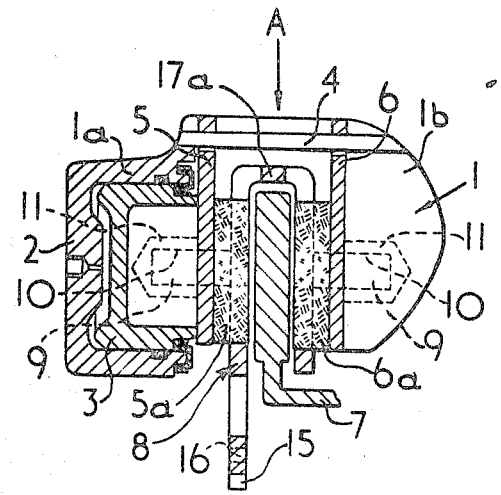
FIGURE 1 is a diagrammatic axial cross-section through a disc brake according to the invention.
Figure 2:
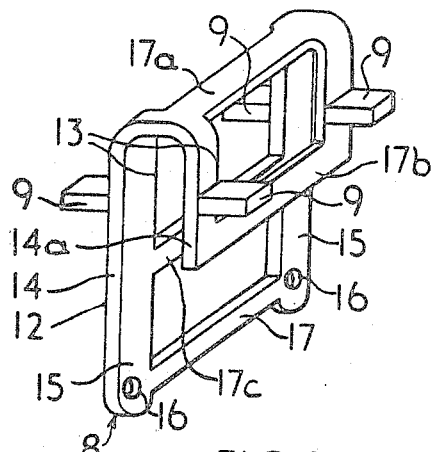
FIGURE 2 is a diagrammatic perspective view of a guide frame for use in a brake of the kind shown in FIGURE 1.

The disc brake shown in FIGURES 1–3 comprises a caliper 1 constructed from two parts or limbs 1a and 1b secured together by bolts 1c in the conventional manner. The limb 1a includes a thrust device comprising a hydraulic cylinder 2 and piston 3. The friction elements of the brake comprise, respectively, backing plates 5 and 6 to which friction pads 5a and 6a are secured, respectively, in the conventional manner. The backing plates of the friction elements are suspended on two spaced apart pins 4 which are detachably secured to the caliper.

The caliper 1 is supported and guided for axial movement relative to a disc 7 by a guide frame 8 which is secured to an associated axle housing (not shown) which forms a nonrotatable support. The guide frame 8 is provided with axially projecting guide members 9 in the form of lugs which are received in corresponding holes 10 in the caliper 1, the arrangement being such that when the brake is operated the caliper can slide on the lugs 9 sufficiently to allow the fixed friction element 6, 6a to be brought into engagement with the disc 7. It will be noted that the construction of the caliper in two parts facilitates assembly of the caliper onto the guide frame.

The holes 10 are formed in guide bushes 11 which are made from polytetrafluoroethylene and which are constructed so that they are able to deform elastically as the caliper moves and thus to provide a retraction effect which tends to centralise the caliper, considered in the axial direction relative to the disc. The bushes 11 may alternatively be made from other plastic material or from rigid material, for example, sintered metal.

The guide frame is shown in more detail in FIGURE 2. It comprises a sheet-metal frame 12 folded around the periphery of the disc to form a structure of U-shaped cross-section having a pair of limbs 14, 14a. One limb 14 of the frame 12 is extended to form attachment straps 15 which are provided with holes 16 for attachment to the nonrotatable support. A transverse bar 17 serves to stiffen the frame.

The limbs 14, 14a of the frame 12 have openings 13 through which the respective friction pads 5a, 6a are slidable axially to engage the disc 7. Transverse bars 17a, 17b, 17c transmit the circumferential braking drag forces to the straps 15 and thence to the points of attachment to the nonrotatable support. The bar 17a is sufficiently narrow to provide spacings (FIGURES 1, 2) in the radially outer portions of the caliper to permit radial removal of the friction elements without removing the guide frame. As can be seen in FIGURE 1, each friction element can be removed radially relatively to the frame and to the caliper, once the two pins 4 are removed. The four guide lugs 9 are attached to the limbs 14, 14a of the guide frame as shown.

FIGURE 3 includes a diagrammatic illustration of a suitable parking brake mechanism. The parking brake comprises an operating lever 19 one end 19a of which is received in a thrust cup 18 formed in the backing plate 5. The other end of the lever 19 is provided with a hole 19b for connection to a hand brake operating cable (not shown). A link 20 attached to the caliper by a pivot 21 is secured to the lever 19 by a pivot 21a at a point between the ends of the lever 19. In operation, the lever 19 is moved in the direction of the arrow B to apply the parking brake, thus tending to straighten the toggle mechanism constituted by the lever 19 and link 20. The lever 19 through its one end 19a will apply the associated friction pad directly and the reaction force of such application will, acting through pivot 21, causes the caliper 1 to be moved in a direction causing the other friction pad 6a to be applied against the disc (not shown).

The parking brake illustrated in FIGURE 3 does not include means for adjustment, but such means may take the form illustrated in FIGURE 4 in which the thrust cup 18 is replaced by the recessed head 22 of an adjustment member in the form of a screw 23 which is screwed into a corresponding screw-threaded bore in the pad backing plate 5. A lock nut 24 is provided to prevent the screw 23 from rotating during operation of the brake: adjustment may be effected by loosening the lock nut 24 and turning the screw 23.

FIGURE 5 shows a form of parking brake which incorporates means for automatic adjustment as the friction pads wear. An operating lever 19 is provided, and is movable in the direction of the arrow C to apply the brake. The operating lever 19 is connected to a thrust rod 28 which passes through an aperture 25 in the backing plate 5 and is provided with a lock ring 27. The lock ring 27 is formed with a frusto-conical surface 27a engageable with a corresponding surface formed in a socket 26 integral with the backing plate 5. An adjuster spring in the form of a leaf spring 26a is inserted between the ring 27 and a lip 26b to urge the ring to the position shown in FIGURE 5, in which its inner surface is maintained in firm engagement with the rod 28. The head 29 of the thrust rod 28 is connected to the end of the lever 19 and also to a return spring 30 which is connected at its other end to a fixed point on the caliper indicated by reference numeral 31. A toggle link 20 is provided, as in the embodiment described above, and a mechanical stop 32 is formed on the operating lever 19 to engage the link 20 and thus to limit the movement of the operating lever in the opposite direction to that indicated by the arrow C.

The operation of the parking brake mechanism shown in FIGURE 5 is as follows:

When the lever 19 is moved in the direction indicated by the arrow C, the toggle mechanism 19, 20 tends to straighten and thus to force the thrust rod 28 axially towards the disc. The lock ring 27 is urged towards the disc and its frusto-conical surface 27a engages the corresponding surface of the socket 26 to apply axial pressure to the backing plate 5. The movable friction element 5, 5a is therefore moved axially towards the disc by the thrust rod. On release of the parking brake the return spring 30 withdraws the thrust rod 28 and lever 19 to the position illustrated in FIGURE 5.

When the brake is applied by the hydraulic thrust device, 2, 3 the friction element 5, 5a tends to move the lock ring towards the disc and in doing so compresses the adjuster spring 26a, the thrust rod being held back by the return spring 30 which is arranged to be of greater stiffness than the spring 26a. When, following wear of the friction pads, the movement of the lock ring relative to the socket exceeds the clearance afforded by the axial depth of the socket the spring 26 is fully pressed against the lip 26b, and the lock ring is drawn over the thrust rod 28 towards the disc to take up the excessive clearance arising from pad wear.

Instead of the lock ring 27, any other suitable locking means, for example a ball lock, can be employed to transmit the thrust from the thrust rod 28 to the backing plate 5.

The brakes described above can be produced inexpensively, and have the advantage that the guide members are subjected only to lateral thrusts due to the braking drag and do not have to withstand torque loads. This assist free sliding of the caliper on the guides. Further, the position of the guide members adjacent the disc helps to prevent the intrusion of dirt.

Although the present invention has been illustrated and described in connection with certain selected example embodiments it will be understood that these are illustrative and are by no means restrictive thereof. It is reasonably to be anticipated that those skilled in the art can make numerous revisions and adaptations of the invention to suit individual design requirements and it is intended that such revisions and adaptations which incorporate the herein disclosed principles will be included.

I claim:

1. In a disc brake including a rotatable disc attached to a rotatable vehicle member adapted to be braked and having opposite annular braking surfaces which are frictionally engaged to impede rotation of said disc, a nonrotatable support, a guide-frame attached to said support on one side of said disc and extending over the periphery of said disc and having radially-extending guide members on at least one side of said disc and forming axially extending anchoring surfaces on said guide members, a caliper having a pair of limbs straddling the periphery of said disc, each such limb disposed in axially spaced relation from a respective side of said disc, axially extending means operatively secured to said guide-frame and having slidable engagement with complementary portions on said caliper whereby said caliper is slidably supported relatively to said guide-frame, a first friction element disposed between one limb of said caliper and one side of said disc, axially extending means forming a part of said caliper for supporting said friction element at its radially outer end portions and for providing axial movement freely in an axial direction relative to said caliper and said disc, said anchoring surfaces also forming bearing surfaces which define and substantially limit caliper and friction element movement to axial sliding movements thereof, a second friction element on the other side of said disc and connected to the other limb of said caliper for frictional application with the opposite disc surface, a pressure-responsive member mounted for reciprocable movement in said one limb of said caliper and having a thrust-transmitting connection which provides relative movement between said pressure-responsive member and the confronting surface of said first friction element and is combined with the relatively axially movable first friction element to effect its forcible application against the confronting surface of said disc, said caliper being forced in an opposite direction by the reaction force of such application whereby the second friction element secured to said other limb of said caliper is forcibly applied against the opposite rotor surface.

2. The disc brake in accordance with claim 1 wherein said first mentioned axially extending means is disposed in a plane which contains the axis of said pressure-responsive member and is parallel to the tangential direction of rotation of the disc adjacent said friction elements.

3. The disc brake in accordance with claim 1 wherein said guide members are in the form of two axially projecting lugs which are integrally associated with said guide-frame.

4. In a floating caliper disc brake including a rotatable axially-fixed disc, the structure comprising a nonrotatable support, an axially movable caliper having a pair of limbs straddling a periphery of the disc, one limb having a friction element fixed thereto and the other limb having a friction element and means providing axially movable actuation of said friction element supported relative thereto, a thrust device for moving the movable friction element towards the disc, a guide-frame attached to the support on one side of the disc and extending around the periphery of the disc to provide spaced anchoring surfaces for the friction elements, the guide frame also having axially-extending guide members extending in a plane transversely to the braking surfaces of said disc and associated therewith one on each side of the disc to guide the caliper for free floating axial movement relative to the disc, said frame having two guide members one on each side thereof, said guide members being disposed in the plane which contains the axis of the thrust device and which is parallel to the tangential direction of rotation of the disc adjacent said friction elements, said guide members also including axially projecting lugs secured to said guide frame and bushes provided in said caliper to receive said lugs.

5. A disc brake according to claim 1 wherein said bushes are of plastic material.

6. A disc brake according to claim 1 wherein the guide frame is of sheet-metal folded around the periphery to form a structure of U-shaped cross-section having a pair of limbs one on each side of the disc and attached by one limb to the support.

7. A disc brake according to claim 4 including a parking brake, the parking brake having an operating device in the form of a toggle mechanism comprising an operating lever having one end associated with the movable friction element and the other end associated with an actuating mechanism and a link pivotally attached at one end to the operating lever between the ends of the lever and pivotally attached at its other end to the caliper.

8. A disc brake according to claim 4 wherein a thrust cup is provided on the movable friction element to receive the end of the operating lever.

9. A disc brake according to claim 8 wherein the thrust cup is formed in the head of an adjustment member located in screw-threaded engagement with the movable friction element.

10. A disc brake according to claim 4 wherein said bushes are of sintered metal.

11. A disc brake according to claim 5 wherein said bushes are constructed to provide a retracting effect on said caliper.

12. In a disc brake, including a rotatable disc attached to a rotatable vehicle member and having opposite annular braking surfaces adapted to be engaged for impeding rotation of said disc, a non-rotatable support having limbs projecting over the outer periphery of said disc and defining a notch along at least one side of said rotor to provide anchoring surfaces extending axially at a fixed position relatively to one side of said disc to receive the anchoring thrust of said brake, a caliper straddling the periphery of said disc, one caliper limb having a first friction element connected thereto and, the other caliper limb having a second friction element associated therewith, axially extending means forming a part of said caliper for supporting said second friction element at its radially outer end portions and for providing axial movement freely in the axial direction relative to said caliper and said disc, means forming guide surfaces provided by said support to define and substantially limit movement of said caliper and its attached friction element toward and away from the disc and providing axially free-floatable caliper movement on such guide surfaces, a pressure-responsive member mounted for reciprocable movement in one of the limbs of said caliper with said freely mounted second friction element and having a thrust engagement with said freely mounted second friction element to effect its forcible engagement with the confronting surface of said disc and which provides relative movement between said pressure member and the confronting surface of said freely mounted second friction element, said free-floating caliper being forced in an opposite direction by the reaction force of such engagement of said one friction element to apply the other friction element against its confronting disc surface.

13. In a floating caliper disc brake including a rotatable axially-fixed disc, the structure comprising a nonrotatable support, an axially movable caliper having a pair of limbs straddling a periphery of the disc, one limb having a friction element fixed thereto and the other limb having a friction element and means providing axially movable actuation of said friction element supported relative thereto, a thrust device for moving the movable friction element towards the disc, and a guide frame attached to the support on one side of the disc and extending around the periphery of the disc to provide spaced anchoring surfaces for the friction elements, the guide frame also having axially-extending guide members extending in a plane transversely to the braking surfaces of said disc and associated therewith one on each side of the disc to guide the caliper for free floating axial movement relative to the disc, said disc brake also including a parking brake, the parking brake having an operating device in the form of a toggle mechanism comprising an operating lever having one end associated with the movable friction element and the other end associated with an actuating mechanism and a link pivotally attached at one end to the operating lever between the ends of the lever and pivotally attached at its other end to the caliper, said operating lever being provided with a thrust rod passing through an aperture in the associated friction element, a locking ring being provided on the thrust rod to transmit the thrust to the friction element.

14. A disc brake according to claim 13 wherein the locking ring is frusto-conical in form and is received in a corresponding frusto-conical socket in the friction element, the socket being provided with a lip for moving the ring axially towards the disc whenever friction pad wear occurs during application of the brake by the thrust device.

15. A disc brake according to claim 14 wherein the adjuster spring is inserted between the lip and the locking ring to press the frusto-conical surface of the ring against the corresponding surface of its socket, and a return spring is attached at one end to the thrust rod and at the other end to the caliper, the stiffness of the return spring being greater than the stiffness of the adjuster spring, and a mechanical stop being provided to limit the extent to which the thrust rod can be withdrawn by the return spring axially away from the disc.

References Cited

UNITED STATES PATENTS

| | | |
|---|---|---|
| 3,169,608 | 2/1965 | Press et al. |
| 3,182,754 | 5/1965 | Hahm et al. |
| 3,194,351 | 7/1965 | Swift _____ 188—73 |
| 3,294,200 | 12/1966 | Hodkinson. |
| 3,310,135 | 3/1967 | Wells _____ 188—73 |

FOREIGN PATENTS

| | | |
|---|---|---|
| 1,345,151 | 10/1963 | France. |
| 1,387,368 | 12/1964 | France. |

GEORGE E. A. HALVOSA, Primary Examiner

U.S. Cl. X.R.

188—106, 196